Patented July 22, 1941

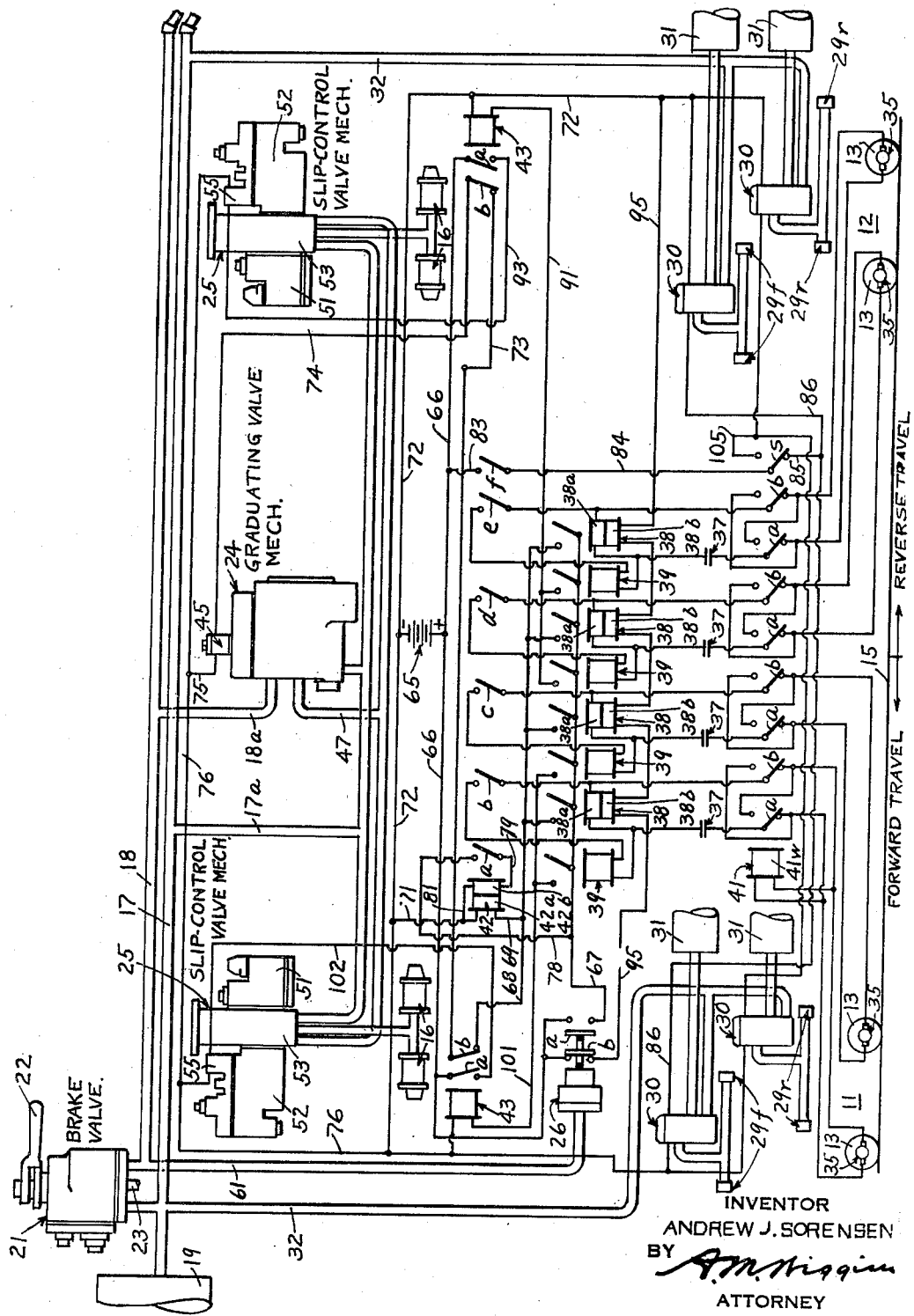

2,249,868

UNITED STATES PATENT OFFICE 2,249,868

BRAKE CONTROL SYSTEM

Andrew J. Sorensen, Pittsburgh, Pa., assignor to The Westinghouse Air Brake Company, Wilmerding, Pa., a corporation of Pennsylvania Application February 29, 1940, Serial No. 321,503

16 Claims. (Cl. 303—21)

This invention relates to brake control systems for vehicles, such as railway cars and trains, and has particular relation to brake control systems having mechanism automatically responsive to the slipping of a vehicle wheel for effecting a rapid reduction in the degree of application of the brakes so that the slipping wheel accelerates back toward a speed corresponding to vehicle speed without actually sliding.

It is well known that if the brakes are applied on a vehicle wheel to a sufficient degree to exceed the adhesion or rolling friction between the rim of the wheel and the road surface or rail on which it rolls, the wheel will decelerate rapidly and in a short interval of time, of the order of a fraction of a second, will attain a locked-wheel state and thus slides. In the present application, the term "slip" refers to the rotation of a vehicle wheel at a speed less than a speed corresponding to vehicle speed, and the term "slide" refers to the dragging of a wheel along the road surface or rail in a locked or non-rotative condition. The distinction between the two terms should be observed.

It has been demonstrated that if the degree of application of the brakes on a wheel is instantly and rapidly reduced when the wheel begins to slip, the wheel will cease to decelerate and will begin to accelerate back toward a speed corresponding to vehicle speed without actually sliding.

Various devices of either a mechanical or electrical type have been proposed for responding to the slipping of a vehicle wheel and causing the instantaneous and rapid reduction in the degree of brake application on a slipping wheel. In certain of the arrangements proposed the reduction in the degree of application of the brakes is terminated and reapplication of the brakes on the slipping wheel is initiated when the wheel ceases to decelerate at a rate exceeding a certain rate while slipping. In other instances, the reduction in the degree of application of the brakes is terminated and reapplication of the brakes is initiated in response to the acceleration of the slipping wheel back toward a speed corresponding to vehicle speed at a rate exceeding a certain rate.

In order to minimize the possibility of recurrent slipping cycles, it has been proposed in some instances to restrict the rate of restoration of the brake application on a slipping wheel to a low rate. In other instances, for the same purpose it has been proposed to restore the application of the brakes on a wheel that slips to a degree less than that which initiated or caused the wheel to slip. Both of such types of controlled reapplication are arbitrarily imposed regardless of the condition of the road surface or rail and the consequent degree of adhesion between the wheel and the road surface or rail.

In my present invention, I propose to provide an arrangement responsive to the degree of adhesion between the wheel and the road surface or rail, for determining automatically the degree to which the brakes are restored after the automatic reduction in the degree of application of the brakes is initiated in response to the slipping of the wheel. To this end I employ means responsive to the rate of acceleration of the slipping wheel back toward a speed corresponding to vehicle speed for measuring the degree of adhesion between the wheel and the road surface or rail and adapted to permit the restoration of the original degree of application which caused the wheel to slip or limit the reapplication to a lesser degree, depending upon the degree of adhesion being high or low respectively. It will be apparent that the rate of acceleration of a slipping wheel back toward vehicle speed will be greater or less dependent upon the adhesion being higher or lower, respectively.

It will also be apparent that if the slipping of the wheel was caused by a momentary bad rail condition or low adhesion between the wheel and the rail or road surface and the rail or adhesion condition is improved while the wheel is slipping, then the restoration of the original degree of application of the brakes is desirable. On the other hand, if the adhesion between a slipping wheel and the road surface or rail remains low, it is desirable to limit the degree of brake application restored to a value less than that which initiated or caused the wheel to slip to prevent repetition of slipping.

It is, therefore, an object of my invention to provide a vehicle wheel brake control system including means automatically responsive to slipping of a wheel to instantly and rapidly effect a reduction in the degree of application of the brakes and thereafter cause termination of the reduction in the degree of application and selectively restore the brake application to different degrees dependent upon the rate of acceleration of the slipping wheel back toward a speed corresponding to vehicle speed, the acceleration rate of the slipping wheel serving as a measure of the adhesion between the wheel and the road surface or rail.

It is another object of my invention to provide a novel arrangement for effecting an instantaneous and rapid reduction in the degree of application of the brakes when a wheel begins to slip and for terminating the reduction in the degree of application of the brakes and initiating a reapplication thereof in response to the acceleration of the slipping wheel back toward a speed corresponding to vehicle speed.

It has also previously been proposed to provide, in a brake control equipment of the character indicated above, sanding control apparatus for effecting automatically the sanding of the road surface or rail in advance of the vehicle wheels for either direction of travel of the vehicle whenever any of the vehicle wheels rotatively decelerate at a rate exceeding a certain rate approaching the maximum rate at which the wheels may be rotatively decelerated under average rail conditions without actually slipping and operative also in case a wheel slips.

In my present invention I propose to provide, in addition to the sanding apparatus, an arrangement for reducing the degree of application of the brakes on all wheels of the vehicle or car a predetermined per cent when the wheels approach the maximum rate of rotative deceleration capable of being attained without slipping. By this expedient, I propose to forestall the occurrence of wheel slipping. It will be apparent that the reduction of the pressure in the brake cylinder or cylinders effected automatically in response to the slipping of a wheel necessitates consumption of a considerable quantity of fluid under pressure in that the fluid under pressure vented from the brake cylinder must be replaced either wholly or in part. By minimizing the possibility of the operation of the automatic venting apparatus in response to slipping of a wheel, the quantity of fluid under pressure consumed and the capacity of the fluid compressor or compressors on the car or train may be correspondingly reduced.

It is, therefore, a further object of my invention to provide a vehicle wheel brake control equipment including means automatically effective when any of the vehicle wheels exceeds a certain rate of rotative deceleration approaching the maximum rate capable of attainment without slipping for causing sanding and, simultaneously with the sanding a predetermined percentage of reduction in the degree of application of the brakes on all wheels of the car.

It is a further object of my invention to provide a vehicle wheel brake control equipment of the character indicated in the foregoing object and including means for instantaneously and rapidly reducing the degree of application of the brakes on a wheel if it should happen to slip.

The above objects, and other objects of my invention which will be made apparent hereinafter are attained by means of an illustrative embodiment of my invention shown in the single figure of the accompanying drawing.

DESCRIPTION OF EQUIPMENT

The brake control apparatus in the single figure of the drawing is shown as applied to a single railway car having two four-wheel trucks, the one at the front end of the car being referred to hereafter as the front wheel truck 11 and the one at the rear end of the car being referred to hereafter as the rear wheel truck 12. It will be understood that each wheel truck has two axles and that each axle has fixed to opposite ends thereof respectively a pair of car wheels which roll on corresponding rails of the track designated by the reference numeral 15. For simplicity only one wheel 13 is shown for each axle. In the subsequent description of my invention, the two axles of each truck will be identified as the leading axle and the trailing axle, respectively, on the assumption that the car is traveling in a forward direction, that is, the left hand direction as indicated by the arrow at the bottom of the figure.

Associated with the car wheels 13 are brake devices, not shown, of any suitable type such as the conventional clasp type brake shoe arrangement for frictionally engaging the rim of the wheels or the not-so-familiar rotary or disk type brake associated with the axle to which the wheels are fixed. The brake devices associated with the car wheels are adapted to be operated by fluid pressure devices such as the brake cylinders 16. As shown, one brake cylinder 16 is provided for each axle but it will be understood that any desired number of brake cylinders may be provided for operating the brakes.

The apparatus for controlling the fluid pressure in the brake cylinders 16 is illustratively shown as comprising two train pipes, referred to hereinafter as the supply pipe 17 and the control pipe 18, respectively; a reservoir 19 to which the supply pipe 17 is constantly connected, which reservoir is referred to hereinafter as the main reservoir and is charged with fluid under pressure from a fluid compressor, not shown; a manually operated brake valve device 21 of the self lapping type for controlling the pressure of the fluid in the control pipe 18 as supplied from the pipe 17 and reservoir 19; a graduating valve mechanism 24; a pair of slip-control valve mechanisms 25, one for each of the wheel trucks 11 and 12; and a pressure-operated switch 26 of any suitable type controlled according to the pressure in the control pipe 18.

The equipment further includes a pair of sanding devices 29f and a pair of sanding devices 29r, of conventional type, for each wheel truck. As diagrammatically indicated, one of each pair of sanding devices is associated with the leading axle and the remaining one of each pair is associated with the trailing axle of each wheel truck. The sanding devices 29f are adapted to operate upon the supply of fluid under pressure thereto to cause sanding of the track rails in advance of the associated car wheels for the forward direction of travel of the car, whereas the sanding devices 29r are adapted to operate upon the supply of fluid under pressure thereto to cause sanding of the track rails in advance of the car wheels when the car is traveling in the reverse direction and corresponding to the right-hand direction indicated by the arrow at the bottom of the figure.

Associated with each pair of sanding devices 29f or 29r on each wheel truck, for the purpose of controlling the supply of fluid under pressure thereto is an electromagnet or magnet valve device 30. Associated with each magnet valve device is a sanding reservoir 31 of a certain limited capacity. Each of the magnet valves 30 comprises a double beat valve which is biased to one of two oppositely seated positions by a biasing spring and which is operated to the other of its two positions in response to energization of a magnet winding. Magnet valves of the type of the magnet valves 30 are well known and accordingly the above description is deemed sufficient for the purposes of this application.

When the magnet winding of any of the sanding magnet valves 30 is deenergized, the magnet valve establishes communication through which fluid under pressure is supplied from a corresponding one of two branch pipes 32 of the supply pipe 17 to the corresponding sanding reservoir 31 to charge the reservoir to the pressure carried in the supply pipe. Upon energization of the magnet winding of each sanding magnet valve 30, the magnet valve closes the charging communication for the sanding reservoir associated therewith and establishes another communication through which fluid under pressure is supplied from the sanding reservoir to the corresponding sanding devices 29f and 29r, such fluid under pressure being exhausted to atmosphere through the sanding devices.

The capacity of the sanding reservoirs 31 is so limited that the fluid under pressure in the sanding reservoir is blown down to atmospheric pressure through the sanding devices in a certain length of time such as ten or fifteen seconds. Accordingly, notwithstanding continued energization of the magnet winding of each of the magnet valves 30, the sanding devices 29f or 29r automatically cease to cause sanding after a certain limited time, thus preventing the continuation of sanding while the car is at a standstill.

The sanding magnet valves 30 for the forward and reverse directions of travel are selectively controlled in accordance with the direction of travel so that the sanding of the track rails is always effected in advance of the car wheels. The manner in which this is accomplished will be explained hereinafter.

The equipment further includes a plurality of direct-current generators 35, one for each axle of each wheel truck, each generator being suitably arranged to be driven according to the speed of rotation of the corresponding wheel and axle unit as, for example, by mounting it in or on the journal housing at one end of the axle and having its armature shaft suitably coupled with the axle.

The generators 35 are so designed as to produce a direct-current voltage at the brush terminals thereof which is substantially proportional at all times to the speed of rotation of the corresponding axle and wheels, the voltage being of opposite polarity for opposite directions of rotation of the axle and wheels. Accordingly, as long as the wheels do not slip, the voltage at the brush terminals of any of the generators varies substantially in proportion to the speed of travel of the car. Associated with each generator 35 are an electrical condenser 37 and two relays 38 and 39, referred to hereinafter respectively as the sanding relay and the slip relay.

The sanding relay 38 and the slip relay 39 are of the polarized type. Each relay has a single contact member which is actuated to one or the other of two positions depending upon the direction of flow of current through the operating winding of the relay, the contact member remaining in the position to which it was last operated notwithstanding deenergization of the operating winding and being shifted to its opposite position only upon reversal of the current through the operating winding.

Each sanding relay 38 has two electromagnet windings, designated 38a and 38b respectively. The winding 38a is the operating winding of the relay which is effective upon energization by current flowing in either direction to correspondingly position the contact member. The winding 38b is a biasing winding which is energized by current flowing always in one direction and effective to bias the contact member of the relay to the open position thereof. The biasing windings 38b of all the sanding relays 38 are connected in series relation and adapted to be simultaneously energized under the control of the pressure switch 26 when the brakes are released to insure restoration of the contact members of the relays to their open position at such time.

As readily seen in the drawing, the operating winding 38a of each sanding relay 38 is connected in series relation with the corresponding condenser 37 across the brush terminals of the corresponding generator 35 subject to the control of a pair of reversing switch contact members $a$ and $b$ of a reversing switch device or relay 41. The reversing relay 41 is a polarized relay of conventional type having a suitable magnet winding 41w and four pairs of the contact members $a$ and $b$ and an additional contact member $s$. Contact member $s$ functions to selectively render the forward sanding magnet valve 30 or the reverse sanding magnet valve 30 on each wheel truck effective depending upon the position thereof.

The magnet winding 41w of the reversing relay 41 is connected across the brush terminals of one of the generators 35 illustrated as the generator 35 associated with the leading axle of the front wheel truck 11. The winding 41w is accordingly energized by current flowing in one direction therethrough when the car is traveling in the forward direction and by current flowing in the opposite direction when the car is traveling the reverse direction. It is to be understood that the arrangement of the relay 41 is such that when the car is traveling in a forward direction, the contact members of the relays are actuated to the position in which they are shown and that when the car is traveling in the reverse direction, the contact members are actuated to the position opposite to that in which they are shown. It should be understood also that the contact members of the relay 41 always remain in the position to which they were last actuated until the direction of flow of current through the operating winding 41w is reversed from that last occurring.

The arrangement of the condenser 37 and the operating winding 38a of the associated sanding relay 38 is such that the current through the winding 38a is substantially proportional to the rate of change of voltage at the brush terminals of the corresponding generator 35 and accordingly proportional to the rate of change of speed of the car wheels. When the speed of the car is increasing, the voltage at the brush terminals of the generators 35 increases at a corresponding rate, thereby causing a charging current to flow in the generator circuit in one direction to charge the condenser 37. Conversely, when the speed of the car decreases, the voltage at the brush terminals of the generators 35 reduces at a corresponding rate, thereby causing the condenser 37 to discharge current in the generator circuit in the reverse direction. The degree of current in the circuit depends upon the rate of change of voltage at the brush terminals of the generator 35, being higher or lower depending upon the rate of change of voltage at the generator brush terminals being higher or lower, respectively.

The operating winding 38a of each sanding relay 38 is so designed and so connected in the generator circuit that when the car is accelerating, the direction of the charging current in each generator circuit is such as to bias the contact member of the sanding relay to its open position. As will hereinafter be explained more fully, the rate of acceleration of the car wheels must exceed a certain rate, such as ten miles per hour per second, in order to cause actuation of the contact member of the relay from its closed position to its open position. On the other hand, the winding 38a of each sanding relay 38 is so designed and the relay so constructed that when the condenser 37 discharges current in the generator circuit of a value exceeding that corresponding to a rate of rotative deceleration of the car wheels of for example three or four miles per hour per second, the contact member of the relay is operated from its open position to its closed position.

As will hereinafter appear more fully, the contact members of all the sanding relays 38 are connected in parallel relation to one another so that the operation of any of the contact members to its closed position establishes a circuit for energizing or picking up a relay 42, hereinafter referred to as the sand-control relay.

The sand control relay 42 is a conventional relay of the neutral type, having two separate electromagnetic windings or coils, 42a and 42b, referred to hereinafter respectively as the pick-up winding and the holding winding, and a plurality of front-contact members a, b, c, d, e, and f. It will be understood that the term "front-contact" as applied to the contact members of the relay 42 is a conventional expression identifying the contact members as being in open position when the pick-up winding and the holding winding of the relay are deenergized and operated to closed position in response to energization of the pick-up winding 42a and maintained in closed position by energization of the holding winding 42b.

Returning to the slip relays 39, these relays have a single operating winding which are adapted to be connected in parallel relation to the operating winding 38a of the corresponding sanding relay 38 under the control of a corresponding one of the contact members of the sand-control relay 42. Thus, for example, the winding of the slip relay 39 in the generator circuit of the leading axle of the front wheel truck 11 is connected in parallel relation to the operating winding 38a of the corresponding sanding relay 38 under the control of the contact member b of the sand-control relay 42.

It should thus be apparent that until the sand-control relay 42 is picked-up in response to the operation of any of the sanding relays 38, the windings of all the slip relays 39 are disconnected from their corresponding generator circuits. When the sand-control relay 42 is picked-up, however, so that the operating windings of the slip relays 39 are connected in parallel with the operating winding 38a of the corresponding sanding relay 38, operation of the contact member of the slip relay to its closed position is effected in response to a current exceeding a certain value flowing through the operating winding of the relay in response to the rotative deceleration of the corresponding car wheels 13 at a slipping rate, that is, a rate which occurs only when the wheel slips, such as ten miles per hour per second. Conversely, with the operating winding of each slip relay 39 connected in parallel relation to the operating winding 38a of the corresponding sanding relay 38, the contact members of the slip relays 39 are operated from their closed to their open positions in response to a charging current in the generator circuit corresponding to a relatively slow rate of acceleration of the corresponding car wheels, such as a rate of three or four miles per hour per second.

Summarizing briefly the character of the sanding relays and the slip relays 39, it should be understood that the contact member of each sanding relay 38 is not actuated from its open to its closed position unless the rate of rotative deceleration of the corresponding vehicle car wheels exceeds a relatively low rate such as three or four miles per hour per second and is not restored to its open position unless the brakes are released or the rate of rotative acceleration of the corresponding car wheels exceeds a relatively high rate such as ten miles per hour per second. Also, the contact member of each slip relay 39 is not actuated from the open to the closed position thereof unless the rate of rotative deceleration of the corresponding car wheel exceeds a relatively high rate, such as ten miles per hour per second, whereas it is restored from its closed to its open position in response to the acceleration of the corresponding car wheels at a relatively low rate, such as three or four miles per hour per second.

The contact members of the slip relays 39 for each wheel truck are connected in parallel relation to each other so that the operation of the contact member of either of the two relays to its closed position is effective to cause energization and the consequent pick-up of a slip-control relay 43. It should be understood, therefore, that the slip-control relay 43 for the front wheel truck is adapted to be picked-up only in response to the operation of the contact members of the two slip relays 39 for the front wheel truck and that the slip-control relay 43 for the rear wheel truck 12 is adapted to be picked-up only in response to the operation of the contact members of the slip relays 39 for the rear wheel truck.

The slip-control relays 43 are conventional relays of the neutral type having an operating winding and two contact members, referred to hereinafter respectively as the front-contact member a and back-contact member b. It will be understood that the front-contact member a is operated from its open to its closed position when the operating winding is energized whereas the back-contact member b is operated from its closed position to its open position when the operating winding of the relay is energized.

The slip-control relays 43 function to control the operation of the graduating valve mechanism 24 and the slip-control valve mechanism 25 in the manner hereinafter to be explained.

In order to assist in further understanding the parts of the equipment and the operation thereof, a brief description of the brake valve device 21, the graduating valve mechanism 24 and the slip-control valve mechanism 25 will now be given.

The brake valve device 21 is of the type described and claimed in Patent 2,042,112 of Ewing K. Lynn and Rankin J. Bush. Briefly, it comprises an operating handle 22 for operatively moving a rotary operating shaft of a self-lapping valve mechanism. In the normal release position of the brake valve handle 22, the self-lapping valve mechanism of the brake valve device is conditioned to vent the control pipe 18 to atmosphere through the exhaust port 23. When the brake valve handle is shifted in a horizontal plane out of its release position into a zone, referred to as the application zone, the self-lapping valve mechanism is operative to supply fluid under pressure to the control pipe 18 from the supply pipe 17 and the connected main reservoir 19. The self-lapping valve mechanism is so designed as to establish a fluid pressure in the control pipe 18 corresponding substantially to the degree of displacement of the brake valve handle out of its release position. If the pressure in the control pipe tends to reduce for some reason, such as leakage, while the brake valve handle is in a certain application position, the self-lapping valve mechanism is automatically effective to continue to supply fluid under pressure to the control pipe to maintain a pressure therein corresponding to the position of the brake valve handle.

It will be understood that the pressure in the control pipe 18 may be controlled by any suitable apparatus and that it is not my intention to limit the control of the pressure in the pipe 18 to a self-lapping brake valve of the type described.

The graduating valve mechanism 24 is of the type described in Patent 2,191,822 of Clyde C. Farmer, assigned to the assignee of this application. Since reference may be had to this patent for a complete description of the graduating valve mechanism 24, it is shown only in outline form and will be described only briefly herein.

The graduating valve mechanism 24 comprises a self-lapping relay valve mechanism adapted to be selectively operated by either of two unconnected movable abutments, in the form of flexible diaphragms, in response to the pressure of fluid supplied to the diaphragms from the control pipe 18 through a branch pipe 18a.

The two diaphragms are of different effective pressure areas and are arranged in coaxial spaced relation in a suitable casing in such a manner as to form a pressure chamber on the outside face of the smaller of the diaphragms and a pressure chamber in the space formed between the two diaphragms. The pressure chamber at the outside face of the smaller diaphragm is constantly connected to the control pipe 18 through the branch pipe 18a and a communicating passage. The chamber between the larger and the smaller diaphragms is selectively connected into the passage leading to the branch pipe 18a or to atmosphere under the control of a double beat type magnet valve 45 depending upon whether the magnet winding of the magnet valve is deenergized or energized respectively.

The effective pressure areas of the two diaphragms of the graduating valve mechanism 24 may have any selected ratio. For the purposes of the present invention it is assumed that the effective pressure area of the larger diaphragm may be represented as one hundred units of area and that of the smaller diaphragms as seventy-five units of area respectively so that the ratio of the area of the larger diaphragm to that of the smaller diaphragm is a four-to-three ratio.

The arrangement of the diaphragms in connection with the self-lapping relay valve portion of the graduating valve mechanism 24 is such that when the magnet winding of the magnet valve 45 is deenergized, fluid under pressure is supplied to the pressure chambers at both sides of the smaller diaphragm, so that the larger diaphragm only is effective to operate the relay valve mechanism due to the balanced relation of the fluid pressure forces on the smaller diaphragm. On the other hand, when the magnet winding of the magnet valve 45 is energized, fluid under pressure is supplied only to the pressure chamber at the outside face of the smaller diaphragm while the pressure chamber between the two diaphragms is vented to atmosphere. Accordingly, the smaller diaphragm only is effective, through the medium of the larger diaphragm, to operate the self-lapping relay valve mechanism.

Due to the difference in the effective pressure areas of the two diaphragms, the relay valve mechanism operates to supply fluid at different pressures in response to a given pressure of fluid supplied from the control pipe 18, depending upon which of the diaphragms is effective. Thus, in the case of the larger diaphragm being effective, the self-lapping relay valve is operated to supply fluid under pressure from the supply pipe 17 through a branch pipe 17a thereof to a supply pipe 47, the pressure established in the pipe 47 being substantially equal to the pressure established in the control pipe 18.

When the smaller diaphragm is effective, the self-lapping relay valve mechanism is operated to establish a correspondingly lower pressure in the pipe 47 for a given pressure in the control pipe 18 in accordance with the lesser effective pressure area of the smaller diaphragm. On the basis of the assumed ratio between the effective pressure areas of the two diaphragms, it will be seen that when the smaller diaphragm is effective the pressure established in the pipe 47 will be seventy-five per cent of the pressure established in control pipe 18.

The slip-control valve mechanism 25 for each wheel truck is of the type described in detail and claimed in Patent 2,218,619 of Donald L. McNeal, assigned to the assignee of this application. Briefly, each valve mechanism 25 comprises a self-lapping relay valve section 51 and a magnet valve section 52, the two sections being secured to opposite faces respectively of an intermediate pipe bracket section 53.

The relay valve section 51 comprises a self-lapping valve mechanism having an operating piston or diaphragm that is subject on one face thereof to the pressure of the fluid in a pressure chamber to which fluid under pressure is supplied through the pipe 47 leading from the graduating valve mechanism 24. The relay valve section of each valve mechanism 25 is operative according to the fluid pressure supplied to the pressure chamber thereof to cause fluid under pressure to be supplied at a corresponding pressure from the branch supply pipe 17a to a pipe 54 leading to the brake cylinders 16 for the corresponding wheel truck.

The magnet valve section 52 of each valve mechanism 25 includes a magnet valve device 55. The magnet valve device 55 is effective, when deenergized, to permit the flow of fluid under pressure from the supply pipe 47 to the pressure chamber of the relay valve section 51 and, when energized, to cut off such supply and to rapidly release fluid under pressure from the pressure chamber so that the relay valve mechanism operates to effect a corresponding rapid reduction of the fluid pressure in the brake cylinders 16.

In addition, the magnet valve portion 52 includes valve mechanism which is effective, once the magnet valve 55 is energized, to cause the rate of flow of fluid under pressure from the supply pipe 47 to the pressure chamber of the relay valve section 51 to be restricted to a rate lower than the normal rate as long as the pressure in the supply pipe 47 exceeds a certain low pressure, such as five pounds per square inch.

The pressure switch 26 may be of any suitable type comprising, for example, a movable abutment in the form of a piston or diaphragm normally biased in one direction, as by a spring, and operated in the opposite direction in response to the pressure of fluid supplied to one side thereof through a branch pipe 61 of the control pipe 18. The pressure switch 26 further comprises an armature having in insulated relation thereon a pair of contact members a and b respectively, the armature being operated in response to movement of the piston or diaphragm. The pressure switch 26 is so designed that when the pressure in the control pipe reduces below a certain low pressure, such as five pounds per square inch, the armature is actuated to the position shown in which the contact member a is in its open position and the contact member b is in its closed position. Conversely, when the pressure in the control pipe exceeds the certain low pressure the armature is correspondingly actuated to cause the contact member a to be moved to its closed position and the contact member b to its open position.

The function of the contact members a and b of the pressure switch 26 will be made apparent hereinafter.

OPERATION OF EQUIPMENT (a) *Conditioning of equipment*

Let it be assumed that the main reservoir 19 is charged to the normal pressure carried therein, for example one hundred pounds per square inch, and that the supply pipe 17 and the sanding reservoirs 31 are thus correspondingly charged with fluid under pressure.

Let it be further assumed that the car is at a standstill and that the brake valve handle 22 is in its release position so that the control pipe 18 is correspondingly at atmospheric pressure. As will be seen hereinafter, fluid under pressure is accordingly exhausted from all of the brake cylinders 16 and the brakes on the car are accordingly released. At the same time, the pressure switch 26 is in its normal position, as shown, due to the pressure in the control pipe 18 being at atmospheric pressure.

Let it be further assumed, now, that with the brake valve handle 22 remaining in its release position, the operator operates a suitable power controller, not shown, to start the car in the forward direction and corresponding to the left-hand direction as seen in the drawing.

When the car exceeds a certain low speed, such as five miles per hour, the voltage produced at the brush terminals of the generator 35 associated with the leading axle of the front wheel truck 11 is sufficient to cause operation of the polarized reversing relay 41 to the position corresponding to the forward direction of travel, if the relay is not already in such position. Thus, substantially at the time the car starts to travel, the pairs of contact members a and b of the relay 41 are shifted to their correct positions corresponding to the direction of travel. These contact members are correctly positioned in the drawing for the forward direction of travel.

Let it be assumed that the car accelerates to a certain high speed such as sixty miles per hour and that the operator then desires to bring the car to a stop. To do so the operator first operates the power controller (not shown) to its power-off position and then shifts the brake valve handle 22 into the application zone thereof an amount corresponding to the desired degree of application of the brakes.

Since the magnet winding of the magnet valve device 45 of the graduating valve mechanism 24 is deenergized, as will be made apparent hereinafter, the charging of the control pipe 18 to a pressure corresponding to the position of the brake valve handle 22 correspondingly results in application of the brakes. It will be apparent that the supply of fluid under pressure from the control pipe 18 to both of the diaphragm chambers of the graduating valve mechanism causes the valve mechanism 24 to supply fluid through the pipe 47 to the pressure chamber of the relay valve section 51 of the slip-control valve mechanisms 25 at a pressure equal to the pressure established in the control pipe 18. Assuming that a pressure of sixty pounds per square inch is established in the control pipe 18, fluid at a pressure of sixty pounds per square inch is supplied to the pressure chamber of the relay valve section 51 of each slip-control valve mechanism 25. Each relay valve section 51 operates in response to the pressure of the fluid supplied to the pressure chamber thereof to supply fluid at a corresponding pressure, that is, sixty pounds per square inch, to the associated brake cylinders 16 to effect application of the brakes to a corresponding degree.

If the rate of rotative deceleration of all of the car wheels 13 produced in response to the application of the brakes does not exceed a rate, such as four miles per hour per second, the pressure in the brake cylinders 16 remains unchanged unless the operator shifts the brake valve handle to vary the pressure in the control pipe 18.

If the operator reduces the pressure in the control pipe 18 by operation of the brake valve handle back toward its release position while the car is decelerating so as to prevent any of the car wheels from exceeding a rate of rotative deceleration exceeding four miles per hour per second, the car is brought to a stop without further operation of the equipment.

If, however, during and in response to the application of the brakes, the car wheels decelerate uniformly and in unison so as to exceed a rate of rotative deceleration in excess of four miles per hour per second, the contact members of all the sanding relays 38 are correspondingly actuated to their closed positions practically simultaneously. Upon the closing of the contact members of the several sanding relays 38, a circuit is established for simultaneously energizing the pick-up winding 42a of the sand-control relay 42 and the magnet winding of the magnet valve device 45 of the graduating valve mechanism 24.

This circuit extends from the positive terminal of a suitable source of direct-current, such as a storage battery 65, by way of a wire 66, contact member a of the pressure switch 26 now in closed position due to the pressure established in the control pipe 18, a bus wire 67, and in parallel through the contact members of the respective sanding relays 38 to a bus wire 68 where the circuit divides into two parallel branches, the one branch extending by way of a branch wire 69, pick-up winding 42a of the sand-control relay 42, and wires 71 and 72 back to the negative terminal of the battery 65, the other branch extending by way of the back-contact member b of the slip-control relay 43 for the front wheel truck 11, a wire 73, back-contact member b of the slip-control relay 43 for the rear wheel truck 12, a wire 74, the magnet winding of the magnet valve device 45 of the graduating valve mechanism 24, and wires 75, 76 and 72 back to the negative terminal of the battery 65.

Upon the closing of the contact member a of the sand-control relay 42 in response to the energization of the pick-up winding 42a, a holding circuit is established for energizing the holding winding 42b of the relay 42. This circuit extends from the positive terminal of the battery 65 to the bus wire 67 as previously traced, thence by way of a branch wire 78, contact member a of sand-control relay 42, a wire 79, holding winding 42b of the relay 42, a wire 81, and wires 71 and 72 back to the negative terminal of the battery 65. It will thus be seen that, once the sand-control relay 42 is picked-up, it is thereafter maintained picked-up independently of the contact members of the sanding relays 38, subject to the opening of the contact member a of the pressure switch 26 at the time the brakes are substantially completely released.

The contact members b, c, d, and e of the sand-control relay 42 are all actuated to their closed positions upon the energization of the pick-up winding 42a of the relay 42 to connect the operating winding of the corresponding slip relays 39 in parallel with the pick-up winding 38a of the corresponding sanding relay 38. The establishment of such connections is without immediate effect, as will be later apparent.

The actuation of the contact member f of relay 42 to its closed position in response to the pick-up of the relay 42 establishes a circuit for energizing the magnet winding of the forward direction sanding magnet valves 30 to cause operation of the forward direction sanding devices 29f on both wheel trucks 11 and 12. This circuit extends from the positive terminal of the battery 65 by way of the wire 66, a branch wire 83, contact member f of the relay 42, a wire 84, contact member s of the reversing relay 41, and a branch wire 85 to a wire 86 where the circuit divides into two parallel branches, one branch extending through the magnet winding of the forward sanding magnet valve 30 on the front wheel truck 11 and by the wires 76 and 72 back to the negative terminal of the battery 65, and the other branch extending by way of the magnet winding of the forward sanding magnet valve 30 for the rear wheel truck 12 and wire 72 back to the negative terminal of the battery 65.

The forward sanding magnet valves 30 accordingly operate to close the charging communication for the sanding reservoirs 31 associated therewith and establish communication through which fluid under pressure is supplied from the sanding reservoirs 31 to the corresponding forward sanding devices 29f so that sanding of the rails in advance of the car wheels is correspondingly effected.

It will be observed that due to the fact that the contact finger f of the sand-control relay 42 remains in closed position as long as the brakes are applied, the sanding of the rails continues, once it is initiated, until the brakes are released or until a certain time elapses sufficient for the fluid under pressure in the sanding reservoirs 31 to be exhausted through the sanding devices 29f, in either of which cases sanding is terminated. As previously indicated, the capacity of the sanding reservoirs 31 is so limited as to automatially terminate the sanding before the car comes to a complete stop, thereby avoiding accumulation of sand on the rails while the car is at a standstill.

The energization of the magnet winding of the magnet valve device 45 of the graduating valve mechanism 24 causes venting of fluid under pressure from the chamber between the larger and the smaller diaphragms of the valve mechanism 24, in the manner previously explained, and this results in the operation of the valve mechanism 24 to reduce the pressure supplied through the pipes 47 to the pressure chamber of the relay valve section 51 of the two slip-control valve mechanisms 25. As previously explained, the pressure established in the pressure chambers of the relay valve section 51, when the magnet winding of the magnet valve 45 is energized, is seventy-five per cent of the pressure established in the control pipe 18. With sixty pounds per square inch fluid pressure established in control pipe 18, the pressure supplied through pipe 47 to the relay valve sections 51 is correspondingly reduced to forty-five pounds per square inch. It should be understood that the fluid under pressure is vented from the chamber between the two diaphragms of the graduating valve mechanism 24 at a controlled rate so that the reduction of the pressure supplied to the relay valve section 51 of each slip-control valve mechanism 25 is not effected instantaneously but rather at a predetermined rapid rate.

The relay valve section 51 of each slip-control valve mechanism 25 operates correspondingly in response to the reduction to forty-five pounds per square inch of the pressure supplied thereto from the graduating valve mechanism 24 to correspondingly reduce the fluid pressure in the brake cylinders 16 associated therewith to forty-five pounds per square inch, so that the degree of application of the brakes on the car is correspondingly reduced.

It will thus be seen that when the car wheels rotatively decelerate in unison at a rate exceeding four miles per hour per second, which as previously explained is the maximum rate which they may attain under average normal rail conditions without slipping, sanding of the rails is automatically effected and, at the same time, a predetermined per cent reduction in the degree of application of the brakes is effected. By thus improving the adhesion between the wheels and the rails and at the same time reducing the degree of application of the brakes, slipping of the wheels which would otherwise occur is prevented. Since slipping of the wheels results in substantial exhaust of fluid under pressure from the brake cylinders on trucks having slipping wheels, it will be seen that the prevention of wheel slipping conserves the supply of fluid under pressure on the car.

In view of the fact that the sanding relays 38 are of the polarized type and, as previously explained, that the contact members thereof are not restored to the open position thereof once they are actuated to the closed position thereof, unless the rotative acceleration of the wheels exceeds a rate, such as ten miles per hour per second or unless the brakes are released, it will be apparent that as long as the wheels corresponding to the relay do not slip or as long as the application of the brakes endures, the graduating valve mechanism 24 will remain effective to cause application of the brakes on the car to a degree which is seventy-five per cent, or some other selected per cent, of the pressure established in the control pipe 18.

If, during an application of the brakes, one or more individual pairs of connected wheels should begin to slip, a further operation of the equipment occurs which will now be described.

Assuming that the rate of rotative deceleration of the car and correspondingly the rate of rotative deceleration of the car wheels does not exceed four miles per hour per second at the time of the occurrence of slipping of one of the pairs of wheels, such as the wheels on the trailing axle of the rear wheel truck 12, the sanding relay 38 and the slip relay 39 corresponding thereto are picked-up in sequential manner as the rate of rotative deceleration of the slipping wheel successively exceeds the rate of four miles per hour per second and ten miles per hour per second.

The sanding magnet valves 30 and the magnet valve device 45 of the graduating valve mechanism 24 are energized in response to the pick-up of the sanding relay 38 in the manner previously described. When the contact member of the slip relay 39 is actuated to its closed position, a circuit is established for energizing the corresponding slip-control relay 43, which in the present instance is the slip-control relay 43 for the rear wheel truck 12. The circuit for energizing the operating winding of the relay 43 for the rear wheel truck 12 extends from the positive terminal of the battery 65 by way of the wire 66 and contact member a of pressure switch 26 to the bus wire 67, thence by way of the contact member of the picked-up relay 39 for the trailing axle of the rear wheel truck 12, a bus wire 91, operating winding of the slip-control relay 43 for the rear wheel truck 12, and wire 72 back to the negative terminal of the battery 65.

The opening of the back-contact member b of the slip-control relay 43 effected in response to the pick-up of the relay interrupts the circuit for energizing the magnet winding of the magnet valve device 45 of the valve mechanism 24 just previously established in response to the closing of the contact member of the sanding relay 38. Thus, momentarily, the graduating valve mechanism 24 is operated to initiate a reduction of the pressure supplied to the pressure chambers of the relay valve section 51 of both slip-control valve mechanism 25 but almost immediately restores such pressure to the pressure equivalent to that established in the control pipe 18. Thus, for all practical purposes, there is no immediate reduction of the pressure in the brake cylinders 16 associated with the front wheel truck 11 in response to the slipping of wheels on the rear wheel truck 12.

The contact member a of the slip-control relay 43 is effective in its closed position, when the relay is picked-up, to establish a circuit for energizing the magnet winding of the magnet valve device 55 of the slip-control valve mechanism 25 for the rear wheel truck 12. This circuit extends from the positive terminal of the battery 65 by way of the wire 66, contact member a of the slip-control relay 43 for the rear wheel truck 12, a wire 93, magnet winding of the magnet valve device 55 for the valve mechanism 25 of the rear wheel truck 12, and wires 76 and 72 back to the negative terminal of the battery 65.

As previously explained, therefore, the supply of fluid under pressure from the pipe 47 to the pressure chamber of the relay valve section 51 of the valve mechanism 25 is cut off and fluid under pressure is rapidly exhausted from the pressure chamber. The relay valve section 51 of the valve mechanism 25 for the rear wheel truck correspondingly operates to effect a rapid reduction of the pressure in the brake cylinders 16 for the rear wheel truck 12, thereby correspondingly rapidly decreasing the degree of application of the brakes on both of the wheels of both axles of the rear wheel truck 12.

Due to the instantaneous and rapid reduction in the pressure in the brake cylinders 16 for the rear wheel truck 12, the slipping wheels on the trailing axle of the rear wheel truck 12 cease to decelerate and begin to accelerate back toward a speed corresponding to car speed without reducing in speed to a locked or non-rotative condition and sliding.

As previously explained, the rate of acceleration of the slipping wheels back toward a speed corresponding to car speed varies dependent upon the rail condition and the consequent adhesion between the wheels and the rails. Assuming that the condition of the rails is bad and that the adhesion between the wheels and the rails is therefore low, the rate of acceleration of the slipping wheels back toward a speed corresponding to car speed will be correspondingly low. If, therefore, the rate of acceleration of the slipping wheels back toward a speed corresponding to car speed is greater than four miles per hour per second but less than ten miles per hour per second, the contact member of only the slip relay 39 corresponding to the slipping wheels is restored to its open position, the contact member of the corresponding sanding relay 38 remaining in the closed position. As a result, the circuit for energizing the operating winding of the slip-control relay 43 for the rear wheel truck 12 is interrupted and the contact members a and b restored to their open and closed positions respectively.

Upon the restoration of the contact member a of relay 43 to its open position, the circuit for energizing the magnet winding of the magnet valve device 55 of the slip-control valve mechanism 25 is interrupted and the magnet valve device 55 is accordingly operated to restore the communication through which fluid under pressure is resupplied to the pressure chamber of the relay valve section 51. It will be noted, however, that as previously explained such resupply of fluid under pressure to the pressure chamber is at a restricted rate. The relay valve section 51 is accordingly operated to restore the pressure in the brake cylinders 16 for the rear wheel truck valve at a lower than normal rate, thereby minimizing the probability of a recurrence of the wheel slipping.

The contact member b of the slip-control relay 43 for the rear wheel truck 12 is effective when restored to its closed position, to reestablish the circuit for energizing the magnet winding of the magnet valve device 45 of the graduating valve mechanism 24 due to the fact that the contact member of the sanding relay 38 associated with the slipping wheels remains closed. The graduating valve mechanism 24 is accordingly operated to reduce the pressure of the fluid supplied to the slip-control valve mechanisms 25 for both wheel trucks to a value which is seventy-five per cent of that established in the control pipe 18.

As long as the rate of acceleration of the slipping wheels back toward a speed corresponding to car speed exceeds a rate of four miles per hour per second but does not exceed a rate of ten miles per hour per second, the fluid pressure built up or restored in the brake cylinders 16 for the rear wheel truck 12 and that to which the fluid in the brake cylinders for the front wheel truck 11 is reduced cannot exceed a value greater than seventy-five per cent of the original pressure which caused the wheels to slip. Thus it will be seen that where the condition of the rails is bad at the time of reapplication of the brakes on a slipping wheel, the degree of pressure restorable in the brake cylinders for the truck having the slipping wheels is limited to a certain per cent or fraction of that value which caused the slipping and at the same time the pressure in the brake cylinders on wheel trucks on which no wheels slipped is reduced to a corresponding value, thereby minimizing the possibility of a recurrence of the slipping on trucks on which the wheels slipped and possibly forestalling the slipping of wheels on other trucks on which no wheels slipped.

It will be appreciated that by forestalling the slipping of the wheels on the front wheel truck and the consequent operation of the corresponding slip-control valve mechanism 25 to effect a substantial reduction in the pressure in the brake cylinders 16 of the front wheel truck 11, the supply of fluid under pressure on the car is conserved and the amount of fluid under pressure required for operation of the brake apparatus is minimized.

On the other hand, if the condition of the rails or road surface is good at the time the slipping wheels accelerate back toward a speed corresponding to car speed, which might be the situation where the slipping of the wheels was caused by a momentarily bad condition on only a short section of track rails passed over by the car, the slipping wheels may accelerate back toward a speed corresponding to car speed at a rate exceeding ten miles per hour per second. In such case, the contact members of both the slip relay 39 and the sanding relay 38 for the slipping wheels are restored in succession to their open positions.

The slip-control relay 43 for the rear wheel truck 12 is accordingly dropped-out, as previously described, and operation of the slip-control valve mechanism 25 is thereby effected to resupply fluid under pressure to the brake cylinders 16 for the rear wheel truck.

Due to the restoration of the contact member of the sanding relay 38 to its open position, the restoration of the contact member b of the slip-control relay 43 for the rear wheel truck 12 to its closed position is ineffective, except momentarily, to establish the circuit for energizing the magnet winding of the magnet valve device 45 of graduating valve mechanism 24. Accordingly, the graduating valve mechanism 24 is effective to supply fluid under pressure to the pressure chambers of the relay valve sections 51 of each valve mechanism 25 at a pressure equivalent to that established in the control pipe 18 and, therefore, the ultimate pressure restored in the brake cylinders 16 on the rear wheel truck 12, having the slipping wheels, corresponds to the original pressure at which the wheels slipped. If the bad rail condition is only momentary, the restoration of the original pressure in the brake cylinders 16 of the rear wheel truck should not, therefore, cause a recurrence of wheel slip. In addition, the restoration of the original pressure in the brake cylinders 16 instead of the reduced pressure, enables a higher average retarding effect to be exerted on the car so that the car may be brought to a stop in a shorter distance than might otherwise be the case.

It should be apparent that the restoration of the contact member of a sanding relay 38 to its open position does not terminate sanding because the sand-control relay 42 remains picked-up and therefore causes sanding to continue notwithstanding restoration of the contact member of sanding relay 38 to its open position.

Summarizing briefly the foregoing operation, it will be seen, therefore, that if the adhesion between the wheels and rails is low at the time the slipping wheels accelerate back toward a speed corresponding to car speed, the equipment operates automatically to limit the pressure existing or ultimately restored in the brake cylinders 16 to a certain percentage or fraction of the pressure established in the control pipe 18. On the other hand, if the adhesion between the car wheels and rails is good at the time the slipping wheels accelerate back toward car speed, the equipment is effective to restore the original degree of application of the brakes which caused the wheels to slip. As previously indicated, therefore, the equipment comprising my invention does not arbitrarily limit the degree of application of the brakes ultimately restored on a slipping wheel, after the slipping condition is relieved, to a value lower than that which caused the wheels to slip but limits the degree of application of the brakes restored on the slipping wheel to a fraction or percentage of that which initiated or caused the wheels to slip only in the event that the condition of the rails, and therefore the adhesion between the wheels and rails, remains uniformly bad.

As the car reduces in speed in response to application of the brakes, the operator may in customary manner reduce the degree of application of the brakes by shifting the brake valve handle 22 back toward its release position. In such case, of course, the pressure in the control pipe 18 is correspondingly reduced so that the pressure in the brake cylinders 16 is likewise correspondingly reduced.

When the car comes to a complete stop in response to the brake application, the brakes remain applied to a degree proportional to the fluid pressure established in the control pipe, it being apparent that the brake cylinder pressure may be equal to or a fixed per cent less than the pressure in the control pipe 18 depending upon whether the magnet winding of the magnet valve device 45 of the graduating valve mechanism is deenergized or energized in the manner previously described. In either case, if the car stops on a grade, the operator may vary the pressure in the control pipe 18 as desired to secure an adequate degree of application of the brakes to hold the car on the grade.

When the operator desires to release the brakes prior to again starting the car he may do so by merely returning the brake valve handle 22 to its normal release position. As a result of the consequent reduction of the pressure in the control pipe 18 to atmospheric pressure, the graduating valve mechanism 24 correspondingly operates to reduce the pressure supplied thereby to the pressure chambers of the relay valve section 51 of each slip-control valve mechanism 25 to atmospheric pressure and the relay valve sections 51 correspondingly operate to exhaust the fluid under pressure from the brake cylinders 16 to effect the complete release of the brakes.

At the same time, due to the reduction of the pressure in the control pipe 18 to atmospheric pressure, the contact members a and b of the pressure switch 26 are restored to their open and closed positions, respectively. The contact member a of the pressure switch 26 is effective, when shifted to its open position to deenergize the bus wire 67. As a result, the holding circuit for the holding coil 42b as well as the energizing circuit for the pick-up coil 42a of the sand-control relay 42 are interrupted, thereby causing the contact members of the relay 42 to be automatically restored to their open positions. The contact member f of relay 42 is effective when restored to its open position to interrupt the circuit for energizing the sanding magnet valves 30.

At the same time, due to deenergization of the bus wire 67, the various circuits whereby the magnet valve device 45 of graduating valve mechanism 24, the magnet valve device 55 of the slip-control valve mechanisms 25, and slip-control relays 43 are energized, are interrupted to cause deenergization thereof if they are not previously deenergized.

The contact member b of the pressure switch 26 is effective in its closed position to establish a circuit for energizing the biasing windings 38b of all of the sanding relays 38. This circuit extends from the positive terminal of the battery 65 by way of the wire 66, contact member b of the pressure switch 26, a wire 95 including in series relation therein the windings 38b of the four sanding relays 38, and wire 72 back to the negative terminal of the battery 65.

The purpose of thus energizing the windings 38b of the sanding relays 38 is to insure the restoration of the contact members of the relays to their open positions, so as to be in the proper position when the brakes are subsequently applied, in the event that they were not so restored in response to acceleration of the corresponding wheels.

If a pair of wheels, such as the wheels on the trailing axle of the front wheel truck 11, begins to slip during an application of the brakes, it will be apparent that the corresponding sanding relay 38 and slip relay 39 are picked-up in the manner similar to that described previously for the wheels on the trailing axle of the rear wheel truck 12. Since the contact members of all of the sanding relays 38 are in parallel relation, it will be apparent that the pick-up of the sanding relay 38 for the front wheel truck will cause operation of the sanding devices 29f for both wheel trucks in exactly the same manner as previously described.

Pick-up of either of the slip relays 39 for the front wheel truck 11 is not effective, however, to energize the operating coil of the slip-control relay 43 for the rear wheel truck but, rather, the operating coil for the slip-control relay 43 of the front wheel truck. This circuit extends from the positive terminal of the battery 65 by way of the wire 66, contact member a of the pressure switch 26, bus wire 67, the contact member of slip relay 39 for the trailing axle of the front wheel truck 11, a wire 101, operating winding of the slip-control relay 43 for the front wheel truck 11, and wires 76 and 72 back to the negative terminal of the battery 65.

The contact member a of the slip-control relay 43 for the front wheel truck 11 is effective in its closed position to establish a circuit for energizing the magnet winding of the magnet valve device 55 of the slip-control valve mechanism 25 for the front wheel truck. This circuit extends from the positive terminal of the battery 65 by way of the wire 66, contact member a of the slip-control relay 43 for the front wheel truck 11, a wire 102, magnet winding of the magnet valve device 55 for the slip-control valve mechanism 25 of the front wheel truck 11, and wires 76 and 72 back to the negative terminal of battery 65.

It will thus be seen that the slip-control valve mechanism 25 for a particular wheel truck is not operated to effect a rapid reduction in the brake cylinder pressure unless at least one pair of wheels on that truck slips.

In the event that the operator starts the car in the reverse direction, indicated as the right-hand direction, the contact members of the reversing relay 41 are operated to the position opposite to that in which they are shown when the speed of the car exceeds a certain low speed such as five miles per hour.

As previously explained, the pairs of contact members a and b of the relay 41 reverse the connections in the generator circuit so that the sanding relays 38 and slip relays 39 operate in exactly the same manner notwithstanding the reversal in the direction of travel of the car. It is deemed unnecessary, therefore, to repeat the description of the operation of the equipment for reverse travel of the car.

In the case of contact member f of the reversing relay 41, it will be seen that in its reverse position, it establishes a connection from the wire 84 to a wire 105 that has two branches, in which branches the magnet windings of the two reverse direction sanding magnet valves 30 are respectively connected. Accordingly, when the car travels in the reverse direction the operation of the contact member f of the sand-control relay 42 to its closed position causes energization of the reverse direction sanding magnet valves 30. Thus, the sanding devices 29r are operated to cause sanding in advance of the car wheels.

SUMMARY

Summarizing, it will be seen that I have provided a brake control system for vehicles, such as railway cars and trains, whereby the degree of application of the brakes and sanding of the track rails is automatically controlled so as to minimize the probability of the wheels slipping and, in the event that individual wheels or pairs of connected wheels do slip, to prevent the sliding thereof.

Specifically the equipment comprises a pair of polarized relays, respectively designated the sanding relay and the slip relay, for each pair of connected wheels on a car. These relays are arranged in a condenser circuit connected across the brush terminals of a direct-current generator driven by a corresponding axle so as to supply a voltage substantially proportional to the rotative speed of the axle and the wheel fixed thereto. The current in the condenser circuit is substantially proportional to the rate of rotative deceleration or the rate of rotative acceleration of the vehicle wheels.

The sanding relay is so designed that the contact member thereof is actuated from its open to its closed position only in response to a current flowing in the circuit and exceeding a certain value corresponding to a certain rate of rotative deceleration of the vehicle wheel, such as four miles per hour per second, and that the contact member thereof is restored from its closed to its open position only in response to a reverse current in the circuit exceeding a certain value corresponding to a rate of rotative acceleration of the vehicle wheels, such as ten miles per hour per second.

The slip relay is so designed that the contact member thereof is actuated from its open to its closed position in response to an energizing current in the circuit exceeding a certain value corresponding to a rate of rotative deceleration of the car wheel, such as ten miles per hour per second, and that the contact member is restored from its closed to its open position in response to a reverse energizing current exceeding a certain value corresponding to a rate of rotative acceleration of the vehicle wheels, such as four miles per hour per second.

In addition, the equipment comprises a graduating valve mechanism having an electromagnet valve device which is effective when deenergized to cause application of the brakes to a degree corresponding to the fluid pressure established in a control pipe and when deenergized to cause the application of the brakes to a degree which is a fixed percentage less than that corresponding to the pressure established in the control pipe. The equipment also includes a slip-control valve mechanism for each wheel truck, which valve mechanism normally operates in response to the pressure of fluid supplied from the graduating valve mechanism to effect the supply of fluid at a corresponding pressure to the brake cylinders associated with the wheels of the corresponding wheel truck. Each slip-control valve mechanism has an electromagnet valve device which is effective when energized to cause the slip-control valve mechanism to effect a rapid continued reduction of the pressure in the brake cylinder and when deenergized to cause the restoration of pressure in the brake cylinder to a degree determined by the pressure supplied by the graduating valve mechanism.

In operation, when the sanding relay contact is actuated to its closed position, it causes the magnet valve of the graduating valve mechanism to be energized to effect a reduction in the degree of application of the brakes. At the same time, it causes sanding of the rails to be initiated.

If the contact member of both the sanding relay and the slip relay are actuated to their closed positions, as when the wheels slip, the magnet valve of the slip-control valve mechanism is also energized to cause a rapid continued reduction of the pressure in the brake cylinders associated with the truck having the slipping wheels, as well as sanding.

If the slipping wheels accelerate back toward a speed corresponding to vehicle speed at a rate exceeding four miles per hour per second but less than ten miles per hour per second so as to cause restoration of only the contact member of the slip relay to its open position, the magnet valve of the slip-control valve mechanism is deenergized to cause fluid under pressure to be restored to the brake cylinders at the same time that the magnet valve of the graduating valve mechanism is energized to limit the pressure restored in the brake cylinder to a predetermined percentage less than that established in the control pipe.

If the slipping wheels accelerate back toward a speed corresponding to vehicle speed at a rate exceeding ten miles per hour per second so that the contact members of both of the slip relay and the sanding relay are restored to their open positions, then the magnet valve devices of the slip-control valve mechanism and of the graduating valve mechanism are deenergized and the pressure restored in the brake cylinders to a value corresponding to that established in the control pipe.

In order to insure the return of the contact member of each sanding relay to its open position, in the event that the rate of acceleration of the corresponding wheels back toward a speed corresponding to vehicle speed is insufficient to effect such result, I provide a biasing winding on each sanding relay which is adapted to be energized in response to the release of the brakes. The energization of the biasing winding insures the restoration of the contact member of the sanding relay to its open position so that it is properly positioned prior to the subsequent application of the brakes.

It will, therefore, be seen that I employ the rate of rotative acceleration of a slipping wheel back toward a speed corresponding to vehicle speed as an indication of the degree of adhesion between the vehicle wheel and the rail. Thus if the adhesion is low, the rate of acceleration of the slipping wheel is correspondingly low and the degree of reapplication of the brakes on the wheel is correspondingly limited to a value lower than that which initiated the slipping of the wheel. On the other hand, if the adhesion is high at the time of reapplication of the brakes on a slipping wheel, the correspondingly higher rate of acceleration of the slipping wheel back toward a speed corresponding to vehicle speed causes restoration of the original degree of application in effect at the time slipping of the wheel began.

It will be apparent that while I have described my invention in connection with a single car, it may be readily applied to a train of cars because successive cars may be coupled together and the various sections of the control pipe 18 and supply pipe 17 connected through suitable hose couplings in the manner indicated in the drawing, the equipment on each car substantially duplicating that shown in the drawing.

In addition, various other additions, omissions or modifications may be made in the embodiment shown without departing from the spirit of my invention.

Having now described my invention, what I claim as new and desire to secure by Letters Patent, is:

1. Brake control apparatus for a wheeled vehicle comprising, in combination, means for causing application and release of the brakes associated with the vehicle wheels, a polarized relay adapted to be actuated from a normal position to an operated position during an application of the brakes in response to the rotative deceleration of a slipping vehicle wheel at a rate exceeding a certain rate and thereafter being restored to its normal position in response to the rotative acceleration of the slipping wheel back toward a speed corresponding to vehicle speed at a rate exceeding a certain rate, means controlled by said relay and effective, as long as the relay is in its operated position, to cause a rapid continued reduction in the degree of application of the brakes and effective, upon restoration of the relay to its normal position, to terminate the reduction and initiate an increase in the degree of application of the brakes, and means effective according to the degree of adhesion between the wheel and the road surface or rail for limiting the application of the brakes restored on the slipping wheel to different degrees.

2. Brake control apparatus for a wheeled vehicle comprising, in combination, means for causing application and release of the brakes associated with the vehicle wheels, means effective during application of the brakes in response to the rotative deceleration of a vehicle wheel at a rate exceeding a certain rate while slipping for initiating a continued reduction in the degree of application of the brakes associated with said wheel and effective in response to the rotative acceleration of the slipping wheel at a rate exceeding a certain rate while the slipping wheel returns to a speed corresponding to vehicle speed to terminate the reduction in the degree of application of the brakes and initiate an increase in the degree of application of the brakes, and means controlled according to the degree of adhesion between the vehicle wheel and the road surface or rails for limiting the application of the brakes restored on the slipping wheel to either one or the other of two certain different increased degrees for a given degree of application established by the first said means.

3. Brake control apparatus for a wheeled vehicle comprising, in combination, means for causing application and release of the brakes associated with the vehicle wheels, means effective during application of the brakes in response to the rotative deceleration of a vehicle wheel at a rate exceeding a certain rate while slipping for initiating a continued reduction in the degree of application of the brakes associated with said wheel and effective in response to the rotative acceleration of the slipping wheel at a rate exceeding a certain rate while the slipping wheel returns to a speed corresponding to vehicle speed to terminate the reduction in the degree of application of the brakes and initiate an increase in the degree of application of the brakes, and means effective to limit the application of the brakes restored on the slipping wheel to one or the other of two certain different increased degrees dependent upon whether the rate of acceleration of the slipping wheel back toward vehicle speed exceeds or does not exceed a second certain rate higher than the first said rate of acceleration.

4. Brake control apparatus for a wheeled vehicle comprising, in combination, means for causing application and release of the brakes associated with the vehicle wheels, means effective during application of the brakes in response to the rotative deceleration of a vehicle wheel at a rate exceeding a certain rate while slipping for initiating a continued reduction in the degree of application of the brakes associated with said wheel and effective in response to the rotative acceleration of the slipping wheel at a rate exceeding a certain rate while the slipping wheel returns to a speed corresponding to vehicle speed to terminate the reduction in the degree of application of the brakes and initiate an increase in the degree of application of the brakes, and means responsive to the rate of acceleration of the slipping wheel back toward a speed corresponding to vehicle speed for limiting the application of the brakes restored on the slipping wheel to a degree less than that in effect at the time slipping of the wheels began if the rate of acceleration of the slipping wheel remains less than a certain rate and adapted to cause the restoration of the application of the brakes to the degree in effect at the time slipping of the wheel began if the rate of acceleration of the slipping wheel exceeds said certain rate.

5. Brake control apparatus for a wheeled vehicle comprising, in combination, means for causing application and release of the brakes associated with the vehicle wheels, means effective in response to the rotative deceleration of a vehicle wheel at a rate exceeding a certain rate when the wheel slips for initiating a continued reduction in the degree of application of the brakes associated with said wheel and effective in response to the rotative acceleration of the slipping wheel at a rate exceeding a first certain rate back toward a speed corresponding to vehicle speed for terminating the reduction in the degree of application of the brakes and initiating an increase in the degree of application of the brakes, and means operative in response to the rotative acceleration of the slipping wheel at a rate exceeding said certain rate but less than a second certain rate higher than the first said certain rate for limiting the application of the brakes restored on the slipping wheel to a degree less than that in effect at the time the slipping of the wheel began and responsive to the rotative acceleration of the slipping wheel at a rate exceeding said second certain rate to cause restoration of the application of the brakes on the slipping wheel to the degree in effect at the time slipping of the wheel began.

6. Brake control apparatus for a wheeled vehicle comprising, in combination, means for causing application and release of the brakes associated with the vehicle wheels, an electrical circuit, means for causing a current to flow in said circuit substantially proportional to the rate of rotative deceleration or acceleration of a vehicle wheel, the flow of current being in opposite directions for deceleration and acceleration respectively, a polarized relay having an operating winding adapted to be connected in said circuit and a contact member, the polarized relay being of such nature that the contact member thereof is actuated from an open position to a closed position in response to a current exceeding a certain value and corresponding to a certain rate of rotative deceleration of the vehicle wheel and actuated from its closed position to its open position in response to a current exceeding a certain value and corresponding to a certain rate of rotative acceleration of the vehicle wheel, and means controlled by said polarized relay and effective to cause a continued reduction in the degree of application of the brakes as long as the contact member of the relay remains in its closed position and effective to terminate the degree of application of the brakes and initiate an increase in the degree of application of the brakes upon the restoration of the contact member of the relay to its open position.

7. Brake control apparatus for a wheeled vehicle comprising, in combination, means for causing application and release of the brakes associated with the vehicle wheels, an electrical circuit, means for causing a current to flow in said circuit substantially proportional to the rate of rotative deceleration or the rate of rotative acceleration of a certain vehicle wheel, the current flowing in opposite directions for deceleration and acceleration respectively, a first polarized relay having an operating winding in said circuit and a contact member which is actuated from an open position to a closed position in response to a current exceeding a certain value and corresponding to a certain rate of rotative deceleration of the said certain wheel, a second polarized relay having an operating winding normally disconnected from said circuit and adapted to be connected in said circuit upon operation of the contact member of the first said polarized relay to its closed position, said second polarized relay having a contact member which is actuated from its open to its closed position in response to a current energizing the operating winding of the relay and corresponding to a rate of rotative deceleration of the said certain wheel exceeding a second certain rate higher than the first said certain rate, the contact member of the said second polarized relay being returned from its closed to its open position in response to a current energizing the operating windings of the relays exceeding a certain value corresponding to a certain rate of rotative acceleration of the said certain wheel, the contact member of the said first polarized relay being restored from its closed to its open position by a current energizing the operating winding of the relay exceeding a certain value corresponding to a second certain rate of rotative acceleration of the said certain wheel higher than the first said certain rate, means controlled by the said second polarized relay adapted to initiate a continued reduction in the degree of application of the brakes while the contact member of the said second polarized relay is in its closed position and to terminate the reduction in the degree of application of the brakes and initiate an increase in the degree of application of the brakes when the contact member of the second polarized relay is restored to its open position, and means controlled jointly by the contact members of said two polarized relays effective, if only the contact member of the said second polarized relay is restored to its open position, to limit the degree of application of the brakes restored to a certain degree less than that in effect at the time slipping of the wheel began and effective, if the contact members of both polarized relays are restored to their open positions, to cause the restoration of the application of the brakes on the slipping wheel to the degree that was in effect at the time slipping of the wheels began.

8. Brake control apparatus for a wheeled vehicle comprising, in combination, a brake cylinder to which fluid under pressure is supplied and from which fluid under pressure is released to effect application and release respectively of the brakes associated with a vehicle wheel, a control pipe adapted to be charged with fluid at different pressures corresponding to a desired degree of application of the brakes, electroresponsive valve means effective when deenergized to cause fluid at a pressure having a certain ratio to that established in said pipe to be supplied to the said brake cylinder and when energized to cause fluid at a pressure having a different ratio to the pressure established in the said pipe to be supplied to the brake cylinder, an electrical circuit, means for causing current to flow in said circuit substantially proportional to the rate of rotative deceleration or the rate of rotative acceleration of the vehicle wheel, the current flowing in opposite directions for deceleration and acceleration respectively, a polarized relay having an operating winding in said circuit and a contact member, said contact member being actuated from its open to its closed position in response to a current energizing the operating winding exceeding a certain value corresponding to a certain rate of rotative deceleration of the given wheel and adapted to be restored from its closed to its open position in response to a current energizing the operating winding exceeding a certain value corresponding to a certain rate of rotative acceleration of the given wheel, said contact member of the relay being effective in its closed position to cause energization of the electroresponsive valve means and in its open position to cause deenergization thereof.

9. Brake control apparatus for a wheeled vehicle, comprising, in combination, means for establishing a desired degree of application of the brakes associated with a vehicle wheel, an electrical circuit, means for causing current to flow in said circuit substantially proportional to the rate of rotative deceleration or the rate of rotative acceleration of the said vehicle wheel, the current flowing in opposite directions for deceleration and acceleration respectively, a polarized relay having an operating winding, a biasing winding and a contact member, the operating winding being connected in said circuit and adapted to cause the contact member to be actuated from an open position to its closed position in response to a current exceeding a certain value and corresponding to a certain rate of rotative deceleration of the vehicle wheel and adapted to cause restoration of the contact member from its closed to its open position in response to a current exceeding a certain value corresponding to a certain rate of rotative acceleration of the given wheel, said biasing winding being effective when energized to cause restoration of the contact member from its closed to its open position independently of said operating winding, means for effecting energization of said biasing winding upon the release of the brakes and deenergization thereof upon application of the brakes, and electroresponsive means controlled by the contact member of said relay effective when the contact member is in its closed position to limit the degree of application of the brakes to a certain fraction of that called for by the first said means and effective when the contact member is in its open position to cause the establishment of a brake application corresponding in degree to that called for by the first said means.

10. Brake control apparatus for a wheeled vehicle comprising, in combination, a pipe adapted to be charged with fluid at a pressure corresponding to a desired degree of application of the brakes, a brake cylinder to which fluid under pressure is supplied to effect application of the brakes associated with a vehicle wheel and from which fluid under pressure is released to effect release of the brakes associated with the vehicle wheel, a relay valve mechanism adapted to be conditioned at one time so as to operate in response to a given pressure established in said pipe to cause fluid at a pressure having a certain ratio to that established in said pipe to be supplied to the brake cylinder and conditioned at another time so as to operate in response to the said given pressure established in said pipe to cause fluid at a pressure having a different ratio to that established in said pipe to be supplied to the brake cylinder, and means responsive to the rate of rotative deceleration of the wheel for so controlling the condition of said relay valve mechanism that as long as the rate of rotative deceleration of the wheel does not exceed a first certain rate the relay valve mechanism is operative to cause fluid to be supplied to the brake cylinder at a pressure having said certain ratio to the pressure in said pipe and effective when the rate of rotative deceleration of the vehicle wheel exceeds said first certain rate for conditioning the relay valve mechanism so as to cause fluid to be supplied to the brake cylinder at a pressure having said different ratio to the pressure in said pipe.

11. Brake control apparatus for a wheeled vehicle comprising, in combination, a pipe adapted to be charged with fluid at a pressure corresponding to a desired degree of application of the brakes, a brake cylinder to which fluid under pressure is supplied to effect application of the brakes associated with a vehicle wheel and from which fluid under pressure is released to effect release of the brakes associated with the vehicle wheel, a relay valve mechanism adapted to be conditioned at one time so as to operate in response to a given pressure established in said pipe to cause fluid at a pressure having a certain ratio to that established in said pipe to be supplied to the brake cylinder and conditioned at another time so as to operate in response to the said given pressure established in said pipe to cause fluid at a pressure having a different ratio to that established in said pipe to be supplied to the brake cylinder, means responsive to the rate of rotative deceleration of the wheel for so controlling the condition of said relay valve mechanism that as long as the rate of rotative deceleration of the wheel does not exceed a first certain rate the relay valve mechanism is operative to cause fluid to be supplied to the brake cylinder at a pressure having said certain ratio to the pressure in said pipe and effective when the rate of rotative deceleration of the vehicle wheel exceeds said first certain rate for conditioning the relay valve mechanism so as to cause fluid to be supplied to the brake cylinder at a pressure having said different ratio to the pressure in said pipe, and means responsive to the rate of rotative deceleration or the rate of rotative acceleration of the given wheel for effecting a rapid continued reduction of the pressure in the brake cylinder whenever the vehicle wheel rotatively decelerates, while slipping, at a rate exceeding a second certain rate higher than the first said certain rate and effective to cause the resupply of fluid under pressure to the brake cylinder only when the slipping wheel accelerates back toward a speed corresponding to vehicle speed at a rate exceeding a certain rate.

12. Brake control apparatus for a wheeled vehicle, comprising, in combination, a brake cylinder to which fluid under pressure supplied to effect application of the brakes associated with a vehicle wheel and from which fluid under pressure is released to effect release of the brakes, a pipe chargeable with fluid at different pressures corresponding to a desired degree of application of the brakes, a graduating valve mechanism variously conditionable so as to operate in response to the pressure established in said pipe to supply fluid at a pressure equivalent to that established in said pipe or a certain fraction of that established in said pipe depending upon the condition to the valve mechanism, a slip-control valve mechanism operative in response to the pressure of the fluid supplied by said graduating valve mechanism to supply fluid at a corresponding pressure to said brake cylinder means effective whenever the rate of rotative deceleration of the vehicle wheels exceeds a certain rate during an application of the brakes to so condition the graduating valve mechanism that it supplies fluid at a pressure which is said certain fraction of that established in the said pipe, and means responsive to the rotative deceleration of the vehicle wheel at a rate exceeding a second certain rate higher than the first said certain rate and occurring when the wheel slips for effecting operation of the slip-control valve mechanism to effect a continued rapid reduction in the pressure in the brake cylinder and operative in response to the rotative acceleration of the vehicle wheel back toward a speed corresponding to vehicle speed at a rate exceeding a certain rate for causing the slip-control valve mechanism to restore the pressure in the brake cylinder to that determined by the condition by the graduating valve mechanism.

13. Brake control apparatus for a wheeled vehicle comprising, in combination, a brake cylinder to which fluid under pressure is supplied to effect application of the brakes associated with a vehicle wheel and from which fluid under pressure is released to effect release of the brakes, a pipe adapted to be charged with fluid at different pressures corresponding to a desired degree of application of the brakes, a graduating valve mechanism variously conditionable to operate at one time in response to the pressure established in said pipe to supply fluid at a pressure equal to that established in said pipe and at another time to supply fluid at a pressure which is a certain fraction of that established in said pipe, a slip-control valve mechanism operative in response to the fluid under pressure supplied by said graduating valve mechanism for supplying fluid at a corresponding pressure to the said brake cylinder, an electrical circuit, means for causing a current to flow in said circuit substantially proportional to the rate of rotative deceleration or the rate of rotative acceleration of the wheel, the current flowing in opposite directions for deceleration and acceleration respectively, a first polarized relay having an operating winding in said circuit and a contact member that is actuated from an open position to a closed position in response to a current energizing the operating winding exceeding a certain value and corresponding to a certain rate of rotative deceleration of the vehicle wheel and adapted to be restored from its closed position to its open position in response to a current energizing the operating winding exceeding a certain value corresponding to a certain rate of rotative acceleration of the vehicle wheel, a second polarized relay having an operating winding and a contact member which is operated from an open position to a closed position in response to a current energizing the operating winding supplied from said circuit and exceeding a certain value corresponding to a second certain rate of rotative deceleration of the vehicle wheel higher than the first said certain rate and occurring only when the wheel slips and adapted to be restored from its closed position to its open position only in response to a current energizing the operating winding supplied from said circuit in excess of a second certain value corresponding to a second certain rate of rotative acceleration of the wheel less than the first said certain rate of rotative acceleration, the contact member of the second polarized relay being effective in its closed position to cause operation of the slip-control valve mechanism to effect a continued rapid reduction of the pressure in the brake cylinder and when restored to its open position to cause operation of the slip-control valve mechanism to restore the pressure in the brake cylinder, and the contact members of both polarized relays being jointly effective to control the condition of the graduating valve mechanism in such manner that when only the contact member of the second polarized relay is restored to its open position the graduating valve mechanism is conditioned to supply fluid under pressure to the slip-control valve mechanism at a pressure which is said certain fraction of that established in the said pipe and that when the contact members of both relays are restored to their open positions, the graduating valve mechanism is conditioned to cause fluid under pressure equivalent to that established in the said pipe to be supplied to the slip-control valve mechanism.

14. Brake control apparatus for a wheeled vehicle comprising, in combination, means operative to call for a certain desired degree of application of the brakes associated with all wheels of the vehicle, a first electroresponsive means effective when deenergized to cause application of the brakes to a degree corresponding to that called for by said first means and when energized to cause application of the brakes to a degree which is a fraction of that called for by said first means, a second electroresponsive means effective when deenergized to cause the application of the brakes associated with only certain wheels to a degree corresponding to that determined by said first electroresponsive means and effective upon energization to cause a rapid continued reduction in the degree of application of the brakes associated with said certain wheels, an electrical circuit, means for causing current to flow in said circuit substantially proportional to the rate of rotative deceleration or acceleration of one of said certain wheels, the direction of flow of current in said circuit being opposite for deceleration and acceleration respectively, a first polarized relay having an operating winding in said circuit and a contact member that is actuated from an open to a closed position in response to a current energizing the operating winding and exceeding a certain value corresponding to a certain rate of rotative deceleration of the said one of said certain vehicle wheels and adapted to be restored from its closed to its open position thereafter when the current energizing the operating winding exceeds a certain value corresponding to a certain rate of rotative acceleration of the said one of the certain wheels, a second polarized relay having an operating winding and adapted to be energized by the current in said circuit and a contact member which is actuated from its open to its closed position in response to current energizing the operating winding and exceeding a certain value corresponding to a second certain rate of rotative deceleration of the said one of the certain wheels occurring only when the wheel slips and adapted to be restored from its closed position to its open position in response to a current energizing the operating winding and exceeding a certain value corresponding to a second certain rate of rotative acceleration of the said one of the certain wheels which is less than the first said certain rate, the contact member of said second polarized relay being effective to cause energization of the second electroresponsive means as long as it is in its closed position and deenergization thereof when restored to its open position, and the contact members of both the polarized relays being effective jointly to cause energization of the first electroresponsive means if only the contact member of the second polarized relay is in its open position and deenergization of the first electroresponsive means if the contact members of both relays are restored to their open positions.

15. Brake control apparatus for a wheeled vehicle comprising, in combination, means for causing application and release of the brakes associated with the vehicle wheels, a polarized relay, means for effecting operation of the polarized relay from a normal position to an operated position only when a vehicle wheel rotatively decelerates at a slipping rate and effective to restore the polarized relay from its operated to its normal position only in response to the rotative acceleration of the said wheel at a rate exceeding a certain rate, and means controlled by said polarized relay and effective when the said relay is operated to its operated position and as long as said relay remains in its operated position to initiate and maintain a continued rapid reduction in the degree of application of the brakes, and effective when the said relay is restored to its normal position to terminate the reduction and initiate an increase in the degree of application of the brakes.

16. Brake control apparatus for a wheeled vehicle comprising, in combination, means for causing application and release of the brakes associated with the vehicle wheels, a polarized relay, means for effecting operation of the polarized relay from a normal position to an operated position only when a vehicle wheel rotatively decelerates at a slipping rate and effective to restore the polarized relay from its operated to its normal position only in response to the rotative acceleration of the said wheel at a rate exceeding a certain rate, means controlled by said polarized relay and effective when the said relay is operated to its operated position and as long as said relay remains in its operated position to initiate and maintain a continued rapid reduction in the degree of application of the brakes, and effective when the said relay is restored to its normal position to terminate the reduction and initiate an increase in the degree of application of the brakes, and means effective according to the degree of adhesion between the wheel and road surface or rail for limiting the increased application of the brakes restored on the slipping wheel to different degrees.

ANDREW J. SORENSEN.